United States Patent
Oshikiri et al.

(10) Patent No.: US 7,991,050 B2
(45) Date of Patent: Aug. 2, 2011

(54) MOVING PICTURE DECODING APPARATUS AND MOVING PICTURE DECODING METHOD

(75) Inventors: Makoto Oshikiri, Ome (JP); Tatsuro Fujisawa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 12/392,932

(22) Filed: Feb. 25, 2009

(65) Prior Publication Data

US 2009/0296819 A1    Dec. 3, 2009

(30) Foreign Application Priority Data

May 30, 2008 (JP) ................................ 2008-143502

(51) Int. Cl.
  H04N 7/12    (2006.01)
  H04N 11/02   (2006.01)
  H04N 11/04   (2006.01)
  H04B 1/66    (2006.01)
(52) U.S. Cl. .................................. 375/240.16
(58) Field of Classification Search .................. None
  See application file for complete search history.

(56) References Cited

U.S. PATENT DOCUMENTS

| | | | |
|---|---|---|---|
| 6,327,391 B1 | 12/2001 | Ohnishi et al. | |
| 6,509,930 B1 * | 1/2003 | Hirano et al. | 348/452 |
| 7,426,308 B2 * | 9/2008 | Hsu et al. | 382/239 |
| 2010/0002133 A1 | 1/2010 | Ueno et al. | |

FOREIGN PATENT DOCUMENTS

| | | |
|---|---|---|
| JP | 07-099651 | 4/1995 |
| JP | 08-046929 | 2/1996 |
| JP | 09-266573 | 10/1997 |
| JP | 2002-354483 | 12/2002 |
| JP | 2003-333540 | 11/2003 |
| JP | 2003-333601 | 11/2003 |
| JP | 2004-336369 | 11/2004 |
| JP | 2005-006275 | 1/2005 |
| JP | 2006-254485 | 9/2006 |
| JP | 2006-279917 | 10/2006 |
| JP | 2007-142883 | 6/2007 |
| JP | 2008-166932 | 7/2008 |

OTHER PUBLICATIONS

Notification of Reasons for Rejection with English translation in a corresponding Japanese application, application No. 2008-143502 dated May 26, 2009.

* cited by examiner

*Primary Examiner* — Nhon T Diep
(74) *Attorney, Agent, or Firm* — Blakely, Sokoloff, Taylor & Zafman LLP

(57) ABSTRACT

According to one embodiment, a moving picture decoding apparatus comprises a decoding module configured to decode an input stream containing coded moving picture data and coding information of the coded moving picture data and configured to produce decoded moving picture data and decoding information, an interpolation image generation module configured to generate an interpolation image frame to be interposed between frames in the decoded moving picture data, and an image generation control module configured to control the generation of the interpolation image frame based on the decoding information.

12 Claims, 13 Drawing Sheets

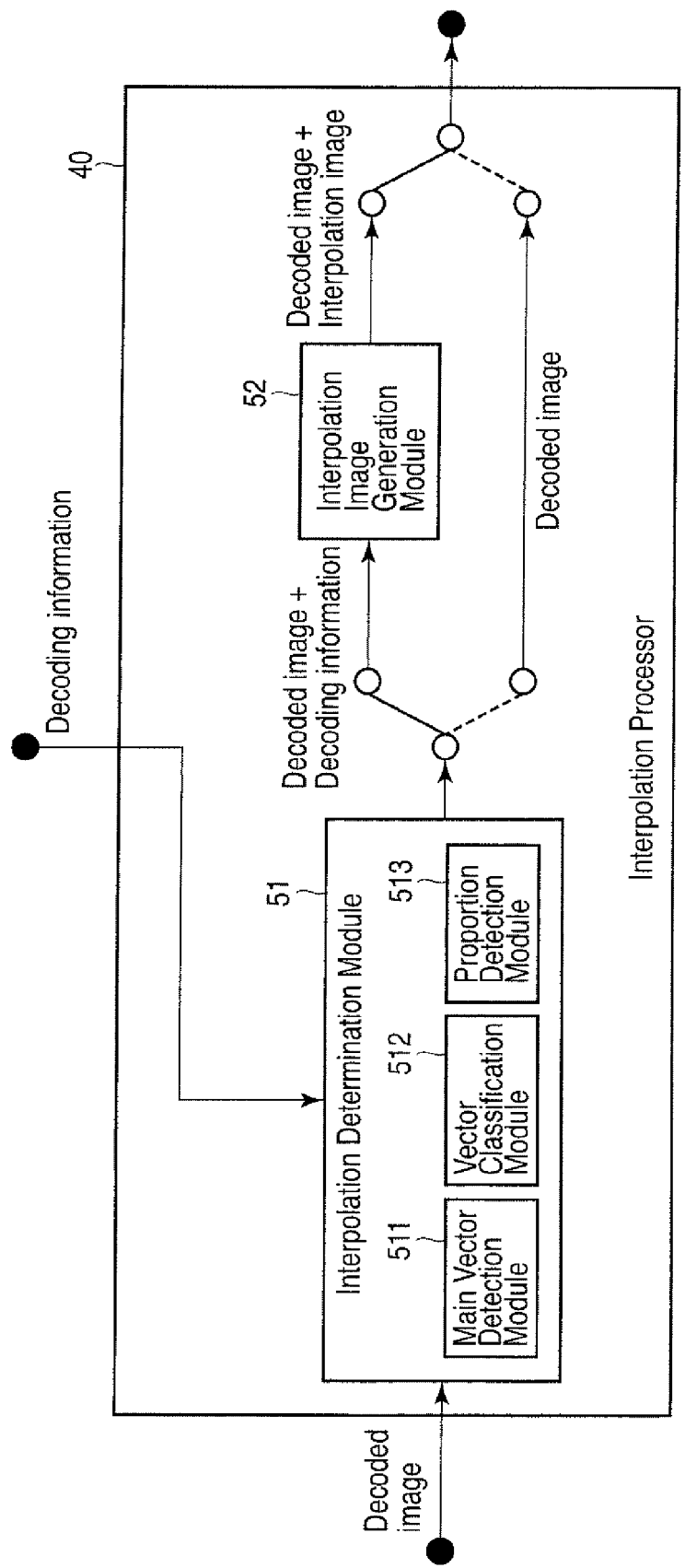
F I G. 2

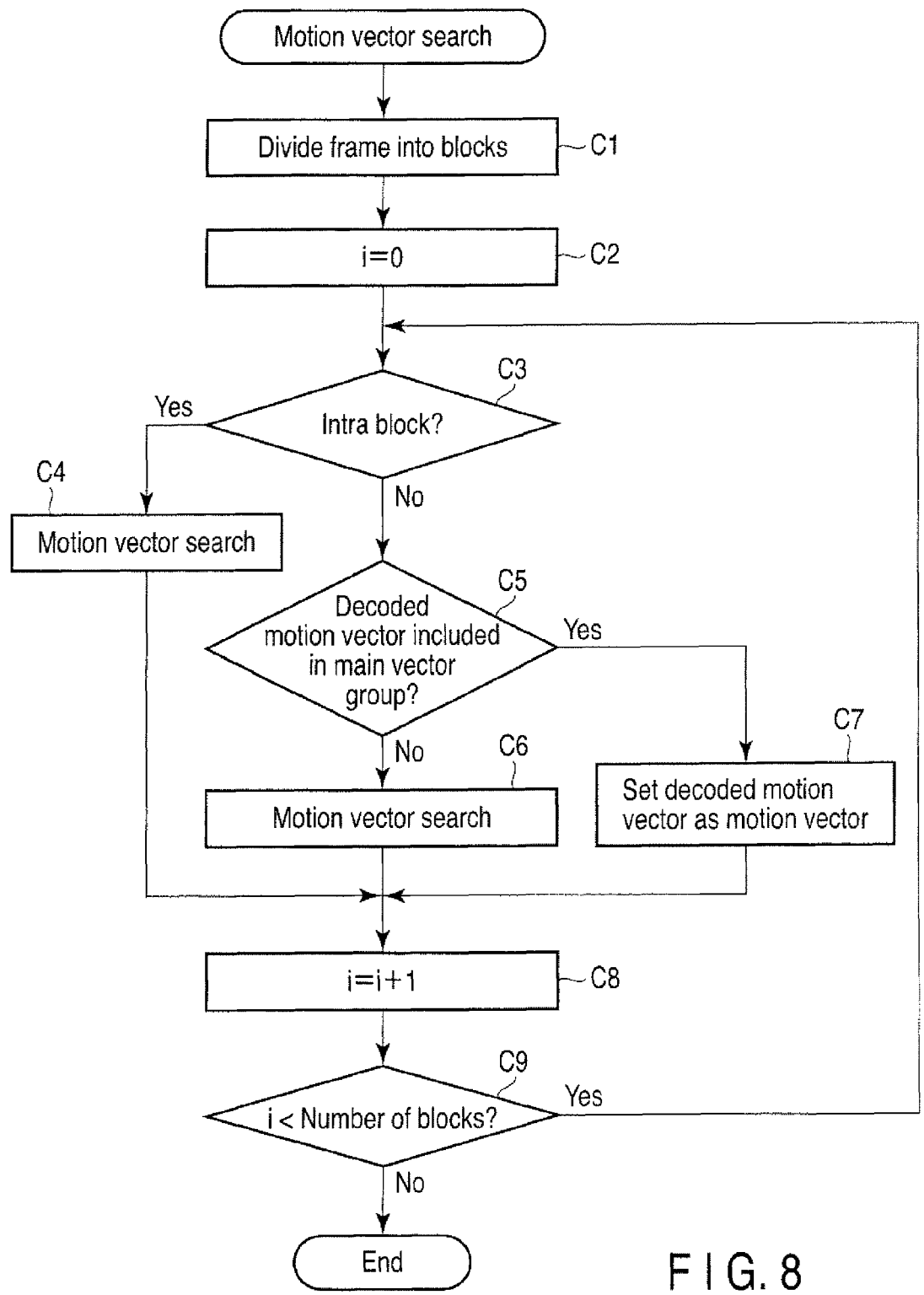
F I G. 8

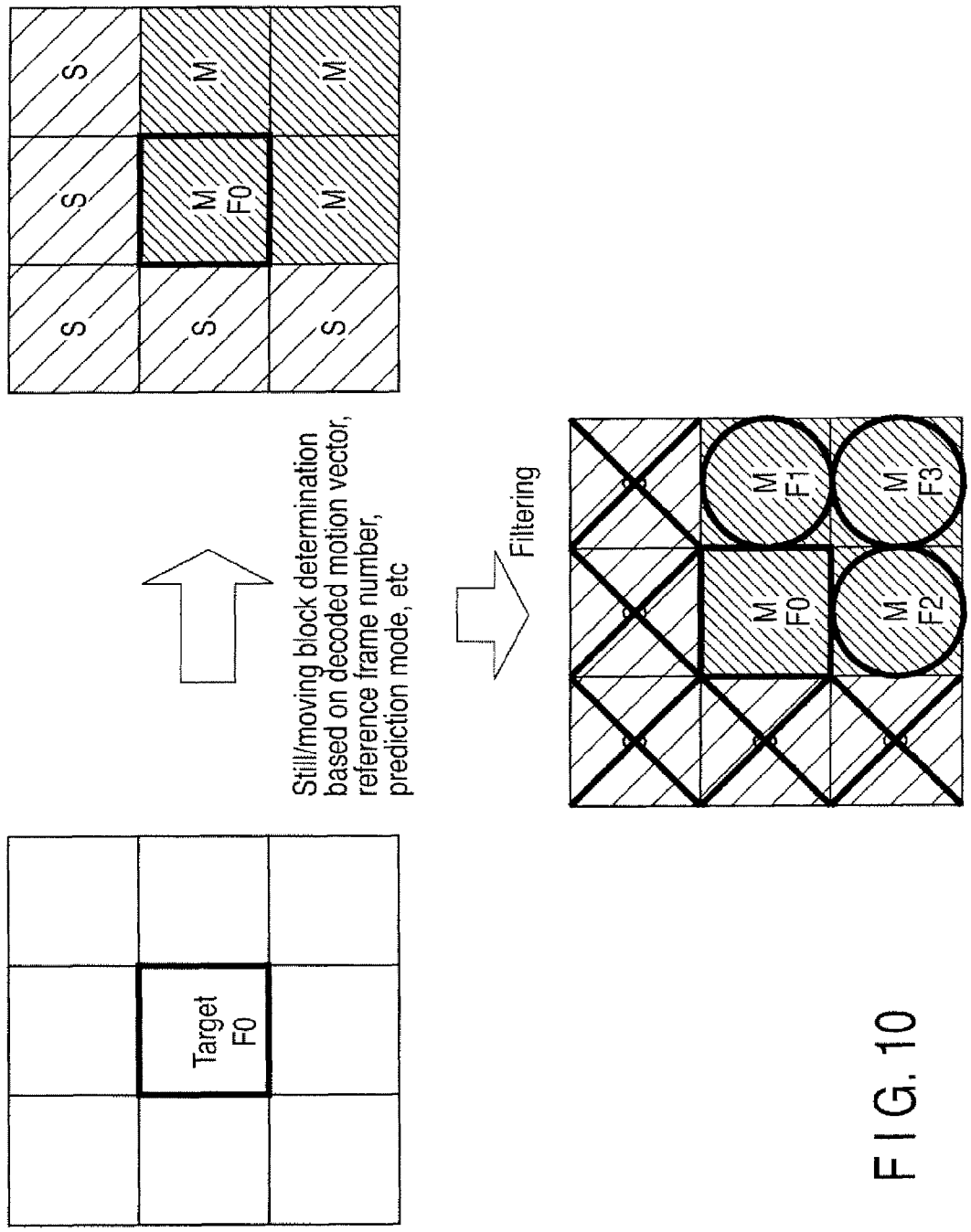
F I G. 10

MOVING PICTURE DECODING APPARATUS AND MOVING PICTURE DECODING METHOD

CROSS-REFERENCE TO RELATED APPLICATIONS

This application is based upon and claims the benefit of priority from Japanese Patent Application No. 2008-143502, filed May 30, 2008, the entire contents of which are incorporated herein by reference.

BACKGROUND

1. Field

One embodiment of the invention relates to a moving picture decoding apparatus, a moving picture decoding method, and a storage medium storing a moving picture decoding program.

2. Description of the Related Art

A moving picture decoding apparatus decodes coded and compressed moving picture data. When decoding moving picture data, the moving picture decoding apparatus commonly uses a technique to make motion appear smooth by predicting a motion between consecutive frames, generating an interpolation image, and interposing the generated interpolation image between the frames.

At the time of generating the interpolation image, in general, a motion-vector which denotes a motion of an object moving in a picture is detected. Then, based on the motion-vector, the motion in the picture between the frames is predicted and the interpolation image is generated.

For example, Jpn. Pat. KOKAI Publication No. 2006-279917 describes a technique of extracting information required to estimate a motion-vector from an input stream and performing a frame interpolation process.

The interpolation image is generated to smooth motion of a moving picture. However, there may be a case in which the generation of the interpolation image is not necessary or interposing the interpolation image even causes deterioration in quality of the moving picture.

For example, interposing an interpolation image between motionless frames produces no visual effect and wastes the amount of calculations. In addition, when continuity is not maintained between frames, e.g., a case in which an image is suddenly switched in the moving picture, prediction of a motion may bring inaccurate result and the interpolation image may be defective. Even in the case where continuity of motion is maintained, when the picture has plural major motions, prediction may fail at a boundary between the motions and false outlines may be created. Accordingly, it may appear that noise is generated. In such cases, generation of the interpolation image is not effective and only causes increase in the amount of calculations.

BRIEF DESCRIPTION OF THE SEVERAL VIEWS OF THE DRAWINGS

A general architecture that implements various features of the invention will now be described with reference to the drawings. The drawings and the associated descriptions are provided to illustrate embodiments of the invention and not to limit the scope of the invention.

FIG. 2 is an exemplary diagram showing an example of a configuration of an interpolation processor;

FIG. 8 is an exemplary flowchart showing an example of a motion-vector search process;

FIG. 10 is an exemplary view showing an example of filtering performed when a target block corresponds to a moving block;

DETAILED DESCRIPTION

Various embodiments according to the invention will be described hereinafter with reference to the accompanying drawings. In general, according to one embodiment of the invention, a moving picture decoding apparatus comprises a decoding module configured to decode an input stream containing coded moving picture data and coding information of the coded moving picture data and configured to produce decoded moving picture data and decoding information, an interpolation image generation module configured to generate an interpolation image frame to be interposed between frames in the decoded moving picture data, and an image generation control module configured to control the generation of the interpolation image frame based on the decoding information.

Embodiments according to the present invention will be described below with reference to the drawings.

Figure 1:
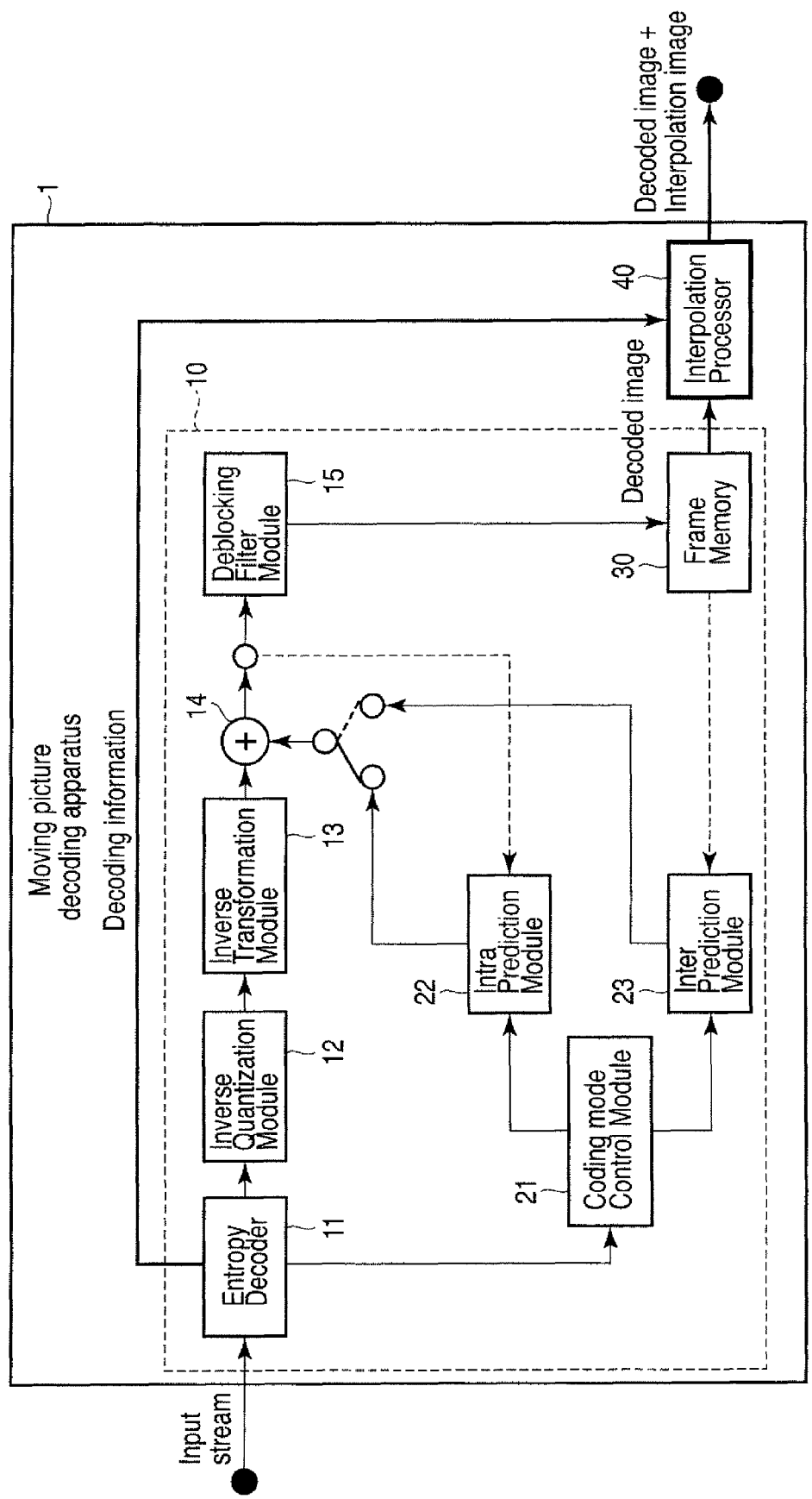
FIG. 1 is an exemplary block diagram showing a configuration of a moving picture decoding apparatus according to an embodiment of the present invention.

FIG. 1 is an exemplary block diagram showing a configuration of a moving picture decoding apparatus 1 according to an embodiment of the present invention. The moving picture decoding apparatus 1 may comprise an H.264/AVC decoder by way of example.

The moving picture decoding apparatus 1 comprises a decoding processor 10 and an interpolation processor 40. An input stream containing moving picture data which is coded using a coding scheme based on H.264 standards is input to the moving picture decoding apparatus 1. The decoding processor 10 performs a decoding process on the input stream and creates decoded image data. The interpolation processor 40 generates an interpolation image to be interposed between frames of the decoded image. Then, the decoded image and the interpolation image are output to the exterior.

An entropy decoder 11 in the decoding processor 10 performs a variable-length decoding process on the input stream that contains coded moving picture data to obtain a quantized discrete-cosine-transform (DCT) coefficient and a quantization parameter QP. In addition, decoding information which contains a decoded motion-vector, a reference frame number, a prediction mode, and the like, is obtained. The quantized DCT coefficient, the quantization parameter QP and the decoding information are output to an inverse quantization module 12. The decoding information is also output to the interpolation processor 40. The decoding information indicates how the input moving picture data is coded. For example, when coding the moving picture data, a motion-vector indicating a motion between frames is detected and coded. The coded motion-vector is decoded to be the decoded motion-vector. The reference frame number and the prediction mode may also be decoded and extracted by the entropy decoder 11 and contained in the decoding information.

The inverse quantization module 12 performs inverse quantization, which depends on system loads of the moving picture decoding apparatus 1, on the quantized DCT coefficient based on the quantization parameter QP to obtain a DCT coefficient. The DCT coefficient is output to an inverse transformation module 13.

The inverse transformation module 13 performs an inverse discrete cosine conversion process on the input DCT coefficient. The result of the conversion process is output to an adder 14 as a residue signal.

The adder 14 adds the residue signal to prediction image data output from an intra prediction module 22 or an inter prediction module 23. Thus, data of a frame image (frame data) is reproduced. The reproduced frame data is output to a deblocking filter module 15 and the intra prediction module 22. The intra prediction module 22 references the generated image data, and the generated image data is also sent to the deblocking filter module 15.

The deblocking filter module 15 performs, on the frame image data output from the adder 14, a process for correcting distortion between coded blocks. The deblocking filter module 15 outputs a result of the correcting process to a frame memory 30.

Based on the result of the decoding by the entropy decoder 11, a coding mode control module 21 determines whether the input moving picture data is coded in an intra-prediction (intra-frame prediction) mode or an inter-prediction (inter-frame prediction) mode.

The intra prediction module 22 performs intra-frame prediction based on the data of the frame image output from the adder 14 and the quantized DCT coefficient obtained by the entropy decoder 11, and generates predicted image data.

The inter prediction module 23 performs inter-frame prediction based on the quantized DCT coefficient obtained by the entropy decoder 11 and a reference image output from the frame memory 30, and generates predicted image data.

The predicted image data output from the intra prediction module 22 or the inter prediction module 23 is selectively input to the adder 14 depending on a coding mode determined by the coding mode control module 21.

The frame memory 30 stores the decoded image data which is processed by the deblocking filter module 15. The stored decoded image data is sent to the interpolation processor 40 frame by frame. The decoded image data is also output to the inter prediction module 23 as reference image data.

The interpolation processor 40 then performs an interpolation image generation process on image signals resulting from the decoding process performed by the decoding processor 10 as described above.

The interpolation processor 40 generates an interpolation image for two consecutive frames in a decoded image. FIG. 2 is an exemplary diagram showing a configuration of the interpolation processor 40.

An interpolation determination module 51 determines, based on the decoding information sent from the entropy decoder 11, whether it is necessary or not to generate an interpolation image for the decoded image data sent from the frame memory 30. A main vector detection module 511 detects a dominant motion-vector (most populous motion-vector) within a frame as a main vector from the decoded motion-vectors contained in the decoding information. A vector classification module 512 classifies the decoded motion-vectors in the frame into three groups: a main vector group, a stationary vector group, and a non-main vector group. A proportion detection module 513 detects proportion of the main vector group in the frame (hereinafter the proportion is denoted by R) and determines based on the proportion R whether it is necessary or not to generate an interpolation image. When it is determined that the generation of the interpolation image is necessary, the decoded image data and the decoding information are output to an interpolation image generation module 52. When it is determined that the generation of the interpolation image is not necessary, only the decoded image data is output to the exterior.

Figure 3:
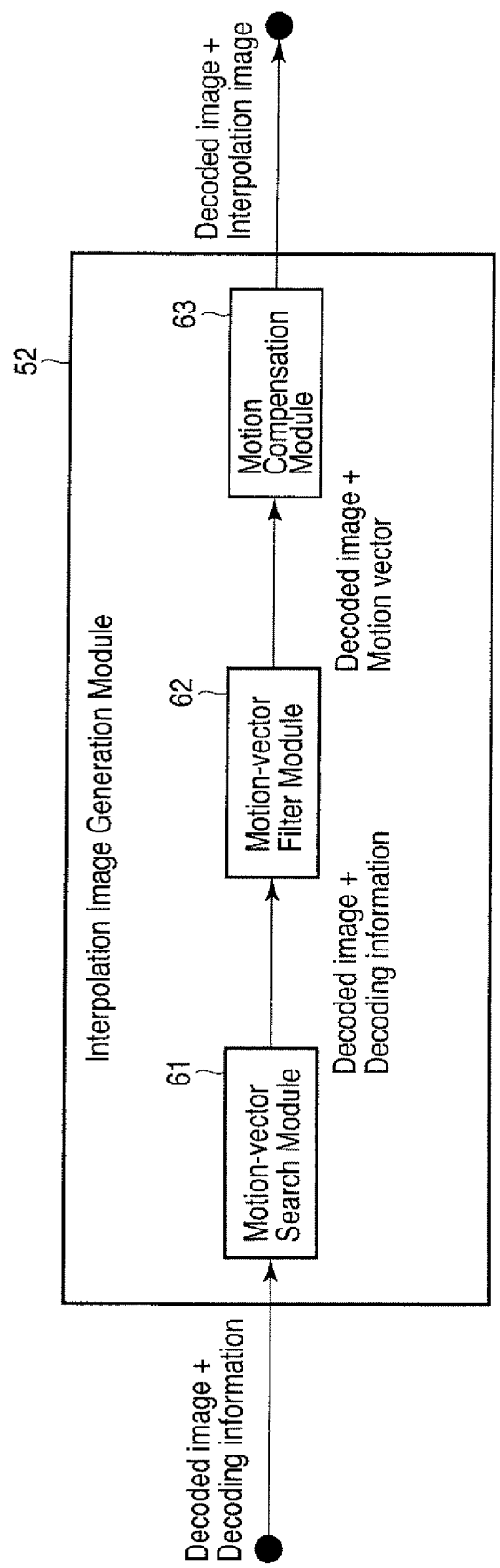
FIG. 3 is an exemplary diagram showing an example of a configuration of an interpolation image generation module.

FIG. 3 is an exemplary diagram showing a configuration of the interpolation image generation module 52.

A motion-vector search module 61 searches each frame for motion-vectors in respective blocks having a predetermined size. Reliability of the motion-vectors contained in the decoding information may be low depending on performance of an encoder used to compress the moving picture. Thus, to achieve high-quality image interpolation, the motion-vector search module 61 re-searches each frame in the decoded image data for motion-vectors of the blocks and newly obtains reliable motion-vectors. In order to reduce the amount or calculations, the motion-vector search module 61 according to the present embodiment operates in conjunction with the interpolation determination module 51 and omits some portions of the motion-vector search.

Figure 4:
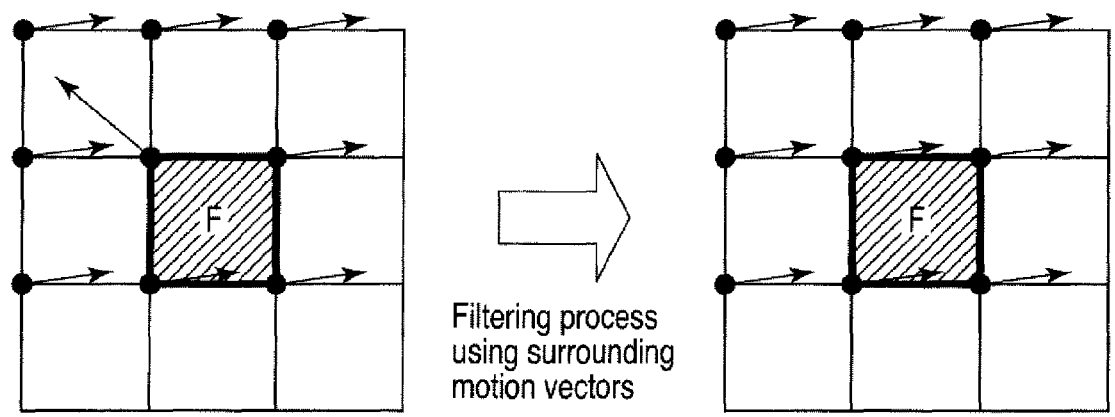
FIG. 4 is an exemplary view showing an example of a general filtering process.

A motion-vector filter module 62 corrects the motion-vectors derived by the motion-vector search module 61. An example of a general correction process is shown in FIG. 4. In FIG. 4, motion-vectors of eight blocks that surround block F to be targeted for the correction are almost uniform. Only the motion-vector of the target block F is significantly different from the surrounding motion-vectors. In this case, the original motion-vector of the target block F may supposedly be similar to the surrounding motion-vectors. The motion-vector of the target block F is considered to be detected incorrectly. Thus, the result of the detection is corrected in such a manner that a median of components of the motion-vectors of the surrounding eight blocks are made to be a component of the motion-vector of the target block F. Alternatively, nine blocks, including the surrounding eight blocks and the target block F, may be used instead of the surrounding eight blocks. As the result of the correction process, the motion-vector incorrectly derived can be adjusted. The above process of replacing the motion-vector of the target block with the median of the motion-vectors of the surrounding blocks is hereinafter referred to as a filtering process. The filtering process may be performed using an average of the motion-vectors of the surrounding blocks instead of the median.

When the filtering process is performed, there may be a case in which even a correct motion-vector is altered. In particular, at a boundary between a moving region and a motionless region in a frame, when the motionless region is also used for the filtering process on a block in the moving region, the motionless region may affect the moving region and a correct motion-vector can not be obtained. To prevent the possible adverse effect due to the filtering process, a more accurate and complicated filtering process may be used. However, the accurate process sharply increases the amount of calculations. Therefore, the motion-vector filter module 62 utilizes the decoding information extracted by the entropy decoder 11 to perform the filtering process, reducing the amount of calculations and improving accuracy. The decoding information containing the motion-vectors corrected by the filtering process is sent to a motion compensation module 63 together with the decoded image data.

The motion compensation module 63 performs motion compensation based on the corrected motion-vectors and the decoded image data, and generates interpolation image data to be interposed between frames. Thus, the generated decoded image data and the interpolation image data are output to the exterior as output image data.

Figure 5:
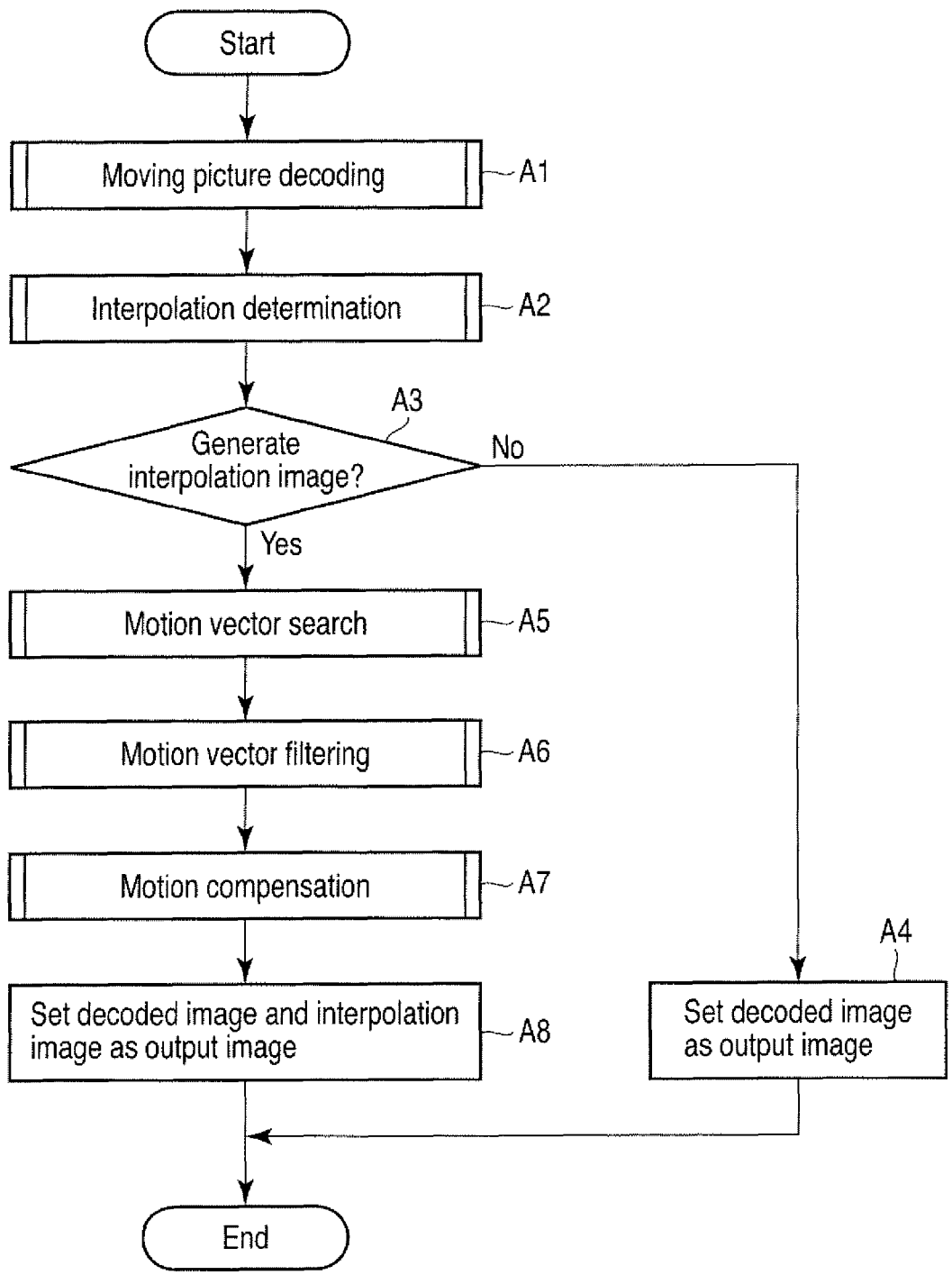
FIG. 5 is an exemplary flowchart showing an example of a moving picture decoding process.

FIG. 5 is an exemplary flowchart of a moving picture decoding process performed by the moving picture decoding apparatus 1.

When coded moving picture data is input to the moving picture decoding apparatus 1, the moving picture data is decoded by the decoding processor 10 (block A1). The decoded image data and the decoding information (decoded motion-vectors, reference frame number, prediction mode, and the like) are output to the interpolation processor 40.

Figure 6:
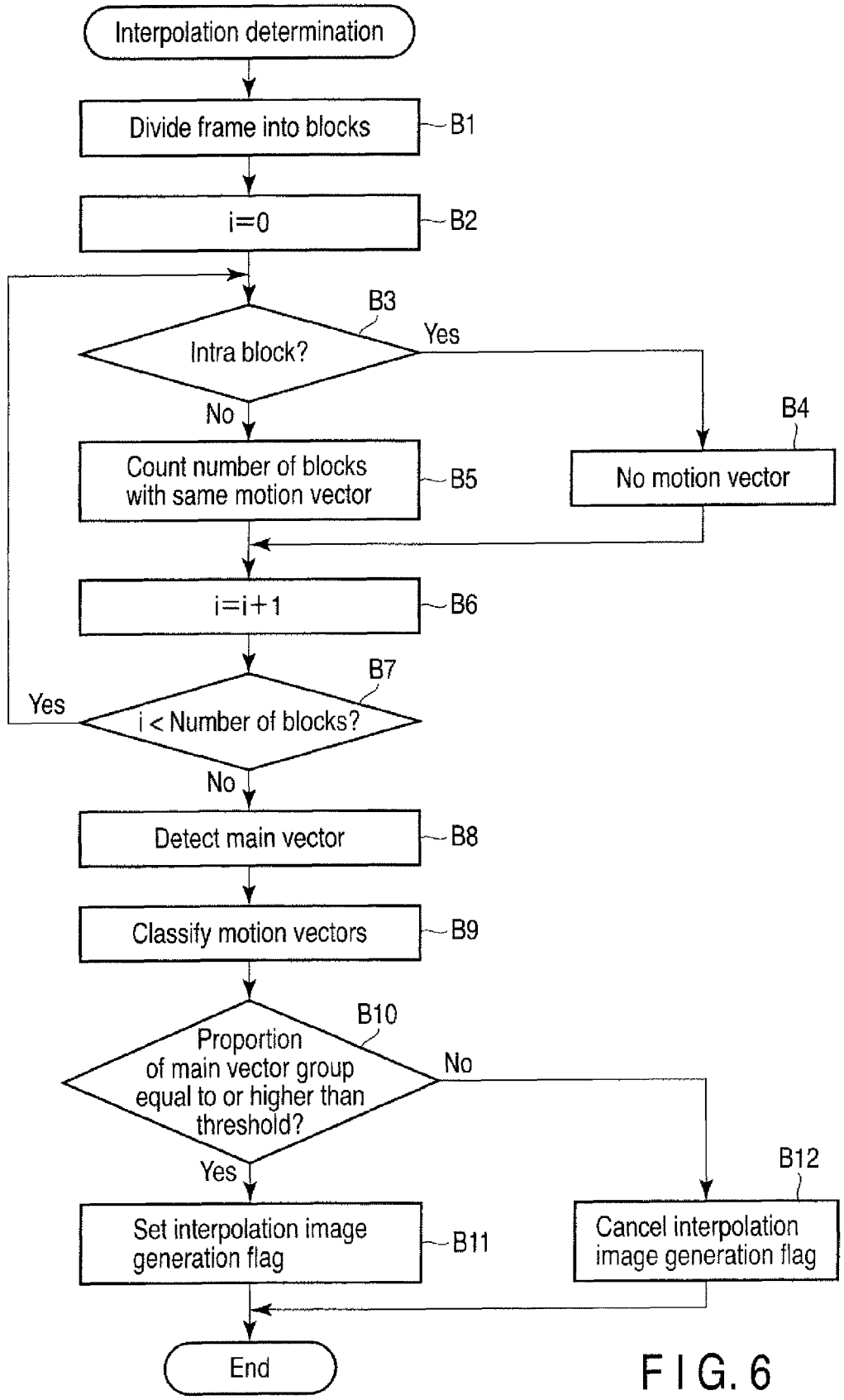
FIG. 6 is an exemplary flowchart showing an example of an interpolation determination process.

The interpolation determination module 51 of the interpolation processor 40 performs an interpolation determination process (see FIG. 6) to determine whether it is necessary or not to generate interpolation image data for the decoded image (block A2). This interpolation determination process is performed based on the decoding information sent from the entropy decoder 11.

The details of the interpolation determination process performed by the interpolation determination module 51 will now be described below.

To smooth motion in a moving picture, a motion between frames is predicted and an interpolation image is interposed between the frames. However, prediction of a motion between discontinuous two frames may result in incorrect prediction and may produce a faulty image. Furthermore, if an interpolation image frame is interposed between two motionless frames, almost no visual effect is exerted; however, processing loads will unnecessarily increase. Thus, the interpolation determination module 51 determines for each frame whether or not to generate an interpolation image.

The main vector detection module 511 divides one frame into blocks, each of which includes a predetermined number of pixels (for example, 8×8 pixels or 16×16 pixels) (block B1). Hereinafter, each of the blocks resulting from the division will be represented by block Li using variable i (i=0 to n−1, n: number of blocks).

Firstly, 0 is substituted for variable i (block B2). The main vector detection module 511 then determines whether or not i-th block Li corresponds to an intra-frame coding region (Intra block) (block B3).

At the time of coding moving picture data, to be coded in the Intra block is not a difference from an inter-frames prediction signal based on motion-vectors, but a difference from a prediction signal generated from pixels within a frame. Thus, when the block Li corresponds to the Intra block, the block Li includes no motion-vector. Whether the block Li corresponds to the Intra block or not can be determined based on a prediction mode of the block which is contained in the decoding information.

When the block Li corresponds to the Intra block (Yes in block B3), it is determined that the block Li does not include a motion-vector (block B4). On the other hand, when the block Li does not correspond to the Intra block but to an inter-frame coding region (Inter block) (No in block B3), it is determined that the block Li includes a motion-vector. The main vector detection module 511 counts the number of blocks having the same motion-vector (block B5).

The process of counting the number of blocks in block B5 may be performed, for example, as follows. That is, the main vector detection module 511 comprises, for each type of motion-vector, a counter in which the number of associated blocks is stored. In block B5, a value in a counter corresponding to the motion-vector of the block Li is incremented.

Then, the value of variable i is incremented by one (block B6). It is determined whether or not the value of i is smaller than the number of blocks n (block B7).

Figure 7:
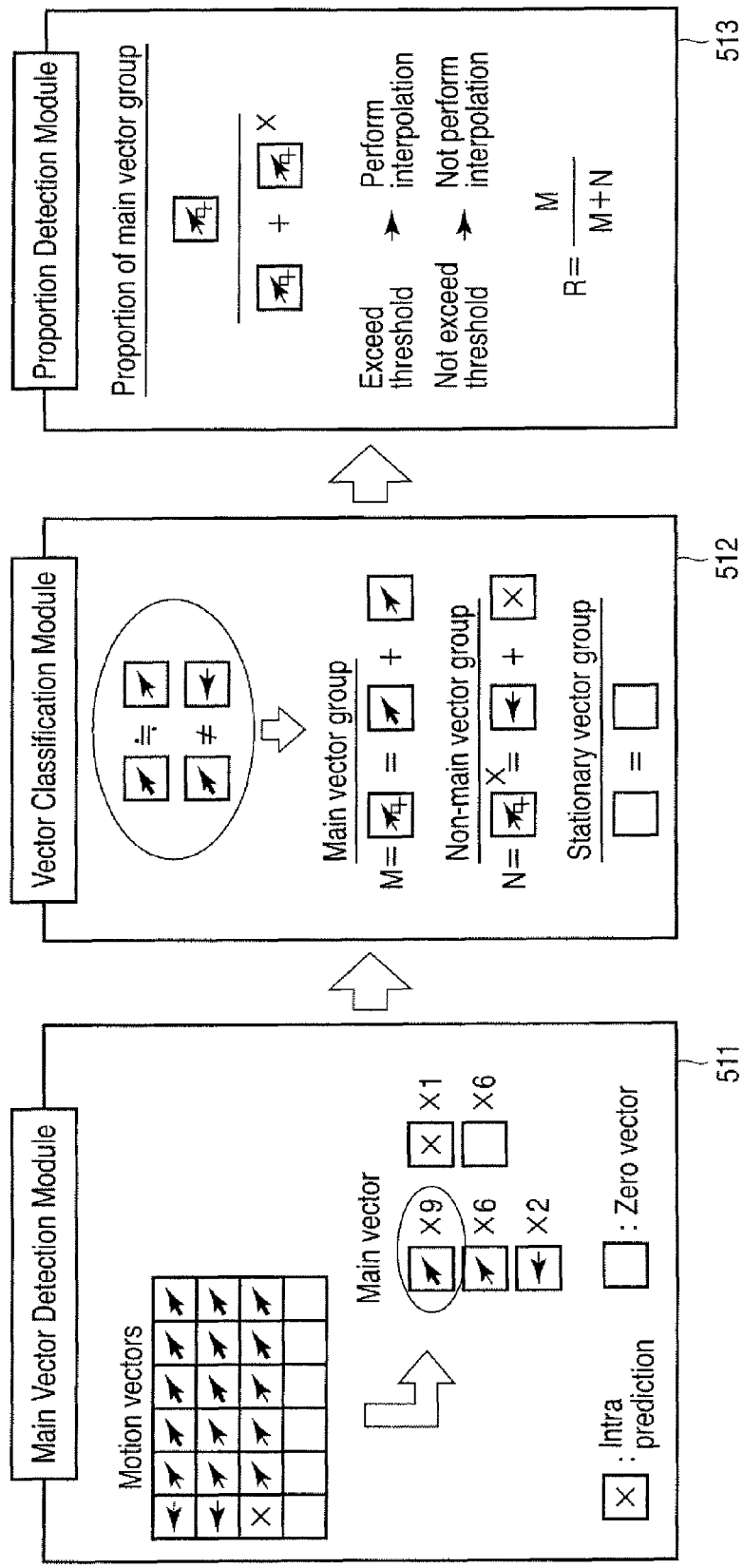
FIG. 7 is an exemplary view illustrating an example of determining proportion of a main vector group in a frame.

When the value of i is smaller than the number of blocks n (Yes in block B7), the flow returns to block B3 and the subsequent processing is repeated on the next block Li. On the other hand, when the value of variable i is equal to or greater than the number of blocks n and the above process is completed on all the blocks (No in block B7), the main vector detection module 511 detects the most populous decoded motion-vector (main vector) in the frame, with the exception of zero-vectors (0, 0) (block B8). That is, as shown in FIG. 7, the main vector detection module 511 counts the numbers of blocks with the same motion-vector and determines a motion-vector largest in number to be the main vector.

The vector classification module 512 classifies the decoded motion-vectors within the frame into three groups (block B9). In the present embodiment, the decoded motion-vectors are classified into three groups: "main vector group", "non-main vector group", and "stationary vector group". As shown in FIG. 7, the main vector and a vector close to the main vector (for example, motion-vector of which distance from the main vector is equal to or smaller than 1) are classified into the main vector group. A motionless zero-vector (0, 0) is determined to belong to the stationary vector group. A motion-vector which is not classified into the main vector group and the stationary vector group is classified into the non-main vector group.

The proportion detection module 513 calculates proportion of blocks corresponding to the main vector group within the frame with the exception of the stationary vector group, and determines whether or not the calculation result is equal to or greater than a predetermined threshold (block B10). When the number of blocks belonging to the main vector group is denoted by M and the number of blocks belonging to the non-main vector group is denoted by N, the proportion R of the main vector group is denoted by R=M/(M+N).

When the proportion R of the main vector group is equal to or greater than the predetermined threshold (Yes in block B10), an interpolation-image generation flag is set (block B11), and then the interpolation determination process is terminated. On the other hand, when the proportion R of the main vector group is smaller than the predetermined threshold (No in block 510), the interpolation-image generation flag is cancelled (block B12), and then, the interpolation determination process is terminated.

As described above, by the above interpolation determination process, the main vector (the most dominant motion-vector within the picture) can be detected and whether to execute or skip generation of an interpolation image can be determined based on the proportion R of the main vectors and the motion-vectors similar to the main vectors.

Referring back to the flowchart of FIG. 5, when the interpolation-image generation flag is cancelled, it is determined that the generation of the interpolation image data is not necessary (No in block A3). In this case, the decoded image data is output as it is (block A4).

On the other hand, when the interpolation-image generation flag is set and it is determined that the generation of the interpolation image data is required (Yes in block A3), the decoded image data and decoding information are sent to the motion-vector search module 61 of the interpolation image generation module 52. The motion-vector search module 61 then performs a motion-vector search process (see FIG. 8) (block A5).

The details of the motion-vector search process will now be described below. FIG. 8 is an exemplary flowchart of the motion-vector search process.

For image interpolation of high-quality, it is preferable to newly obtain reliable motion-vectors by searching the decoded image data for the motion-vectors. Generally in search for motion-vectors, a block matching method is used, in which a matching process is performed for each block and a motion-vector derived when an error is minimal is determined to be a solution. However, performing the matching process for each block involves heavy processing loads. Therefore, the process may be too late and power consumption may be increased. To omit some portions of the motion-vector search, the motion-vector search module 61 according to the present embodiment works with the interpolation determination module 51.

As in the case of the main vector detection, the motion-vector search module 61 divides one frame into blocks, each of which includes the predetermined number of pixels (block C1). Alternatively, the result of the block division in the main vector detection process (see FIG. 6) may be directly utilized.

Then, 0 is substituted for variable i (block C2). The motion-vector search module 61 then determines whether or not i-th block Li corresponds to the Intra block (block C3).

When the block Li corresponds to the Intra block (Yes in block C3), the block Li does not include a motion-vector. However, even a block corresponding to the Intra block may actually have a motion vector; therefore, search for a motion-vector is performed (block C4). A motion-vector resulting from the search is output to the motion-vector filter module 62.

On the other hand, when the block Li corresponds to the Inter block (No in block C3), the motion-vector search module 61 determines whether or not the decoded motion-vector of the block Li belongs to the main vector group (block C5). When the decoded motion-vector corresponding to the block Li does not belong to the main vector group (No in block C5), a motion-vector of the block Li is newly searched for (block C6). The motion-vector newly obtained by the search is output to the motion-vector filter module 62.

When the decoded motion-vector corresponding to the block Li belongs to the main vector group, that is, in the case in which the decoded motion-vector of the block Li is hardly different from the main vector determined by the main vector detection module 511 (Yes in block C5), the search for the motion-vector of the block Li is omitted. The decoded motion-vector is directly output to the motion-vector filter module 62, as a result of the search for a motion-vector, together with the decoded image data (block C7).

Then, the value of variable i is incremented by one (block C8), and it is determined whether or not the value of variable i is smaller than the number of blocks n (block C9). When the value of variable i is smaller than the number of blocks n (Yes in block C9), the flow returns to block C3 and the search for a motion-vector is repeated with respect to the subsequent block Li. On the other hand, when the value of variable i is equal to or greater than the number of blocks n and the search is completed on all the blocks (No in block C9), the motion-vector search process is terminated.

When the motion-vector search process is completed, the flow returns to the flowchart of FIG. 5. A motion-vector filtering process is then performed to further improve the accuracy of the motion-vectors derived from the motion-vector search process (block A6).

Figure 9:
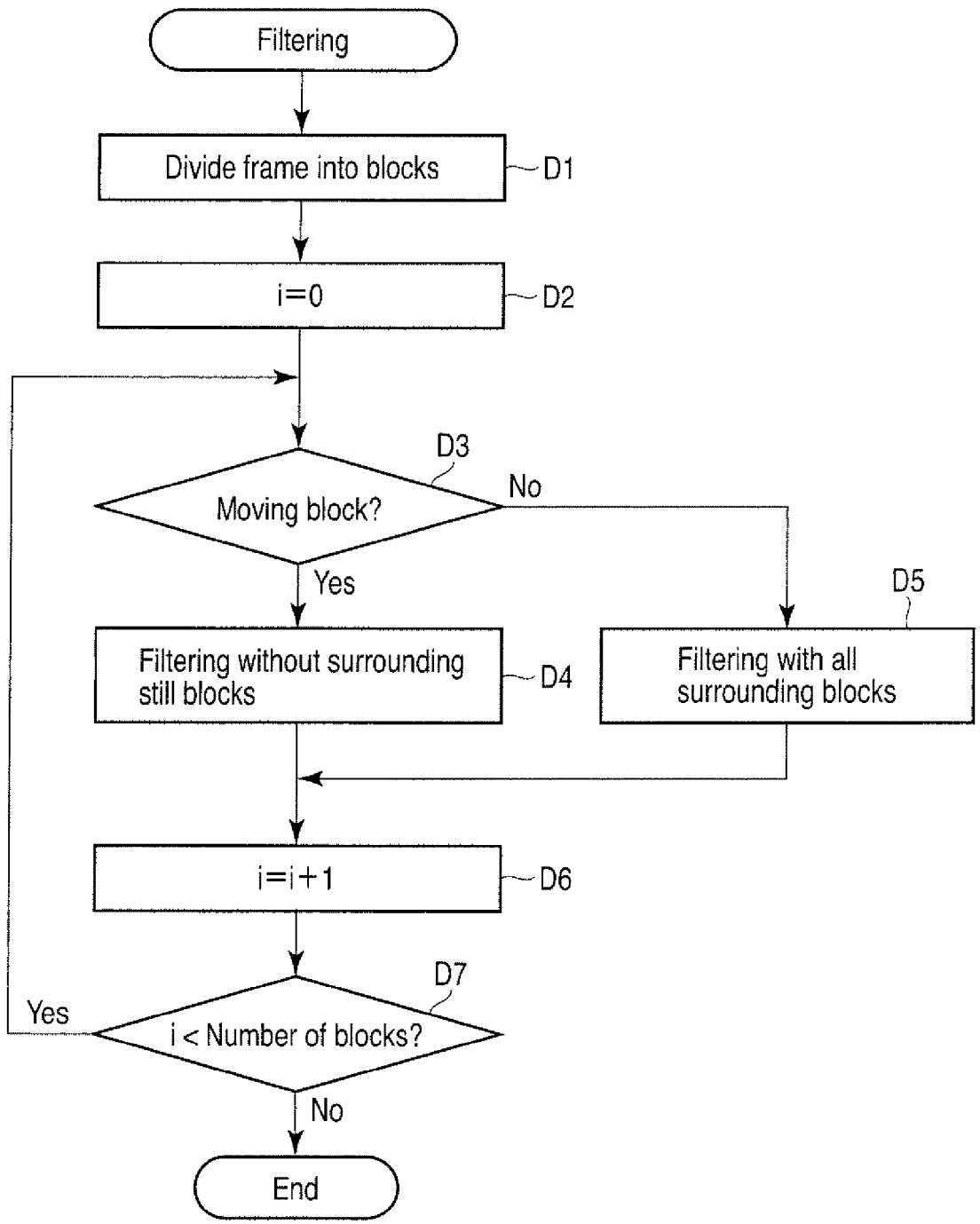
FIG. 9 is an exemplary flowchart showing an example of a motion-vector filtering process.

The details of the motion-vector filtering process will be described below. FIG. 9 is an exemplary flowchart of the motion-vector filtering process according to the present embodiment.

In the filtering process according to the present embodiment, blocks in a frame are categorized into a moving block and a still block. A block, of which a motion-vector resulting from the motion-vector search process is the zero-vector or close to the zero-vector, is called as a "still block". A block which is not the still block is called as a "moving block".

As is the case with the main vector detection process, the motion-vector filter module 62 divides one frame into blocks, each of which includes the predetermined number of pixels (block D1). Then, 0 is substituted for variable i (block D2) and it is determined whether or not i-th block Li corresponds to a moving block (block D3).

When the block Li corresponds to the moving block (Yes in block D3), the filtering process is performed using only the motion-vector or motion-vectors corresponding to the moving block and without using the motion vector or motion-vectors corresponding to the still block (block D4).

On the other hand, when the block Li does not correspond to the moving block but to the still block (No in block D3), filtering process is performed using the motion-vectors of all the surrounding blocks (block D5).

Then, the value of variable i is incremented by one (block D6) and it is determined whether or not the value of variable i is smaller than the number of blocks n (block D7). When the value of variable i is smaller than the number of blocks n (Yes in block D7), the flow returns to block D3 and the filtering is repeated on the subsequent block Li. On the other hand, when the value of variable i is equal to or greater than the number of blocks n and the filtering is completed on all the blocks (No in block D7), the motion-vector filtering process is completed. A motion-vector resulting from the filtering is sent to the motion compensation module 63 together with the decoded image data.

According to the filtering process, as shown in FIG. 10, when block F0 targeted for the filtering corresponds to the moving block (denoted by M in FIG. 10), motion-vectors of blocks corresponding to the still block (denoted by S in FIG. 10) of the eight blocks surrounding the target block F0 are not utilized in the filtering. In FIG. 10, the target block F0 can be regarded as corresponding to the moving block (M) which is located at a boundary with the still block (S). It is not preferable to perform, on such a moving block, filtering process allowing the still block to affect the moving block. According to the filtering process of the present embodiment, the motion-vector of the target block F0 is subjected to the filtering process using a median of the motion-vectors of the surrounding moving blocks F1, F2, and F3. Thus, effects from the still blocks can be eliminated.

After the filtering process is completed, the flow returns to the flowchart of FIG. 5. The motion compensation module 63 performs a motion compensation process (block A7). The motion compensation module 63 generates interpolation image data based on the motion-vectors and the decoded image data input from the motion-vector filter module 62. The decoded image data and interposed interpolation image data are output to the exterior as output image data (block A8). The decoding process is thus completed.

In the interpolation determination process (FIG. 6) according to the present embodiment, whether to generate an interpolation image or not is determined depending on proportion R of the main vector group in the frame. That is, in the present embodiment, the interpolation image is generated only when the proportion of the main vector group is high to some extent (for example, the main vector group accounts for 80 percents of motion-vectors in the frame). High proportion of the main vector group indicates that the picture includes only one dominant motion having continuity. For example, a motionless scene includes no dominant motion; therefore, performing an interpolation process on such a motionless scene does not produce significant visual effects but increases the amount of calculations in vain. Furthermore, a scene without continuity of motion, e.g., a moving picture in which the image suddenly changes, does not include a dominant continuous motion. For such a scene, a motion in the picture may be inaccurately predicted to produce an impaired interpolation image. Even a scene having continuity of motion may include plural dominant motions. In such a scene, motion cannot be appropriately predicted at a boundary between motions and false outlines may be created. The false outlines may appear to be noise. Thus, when generation of an interpolation image is not effective and merely increases the amount of calculations, the above-described interpolation determination process cancels the interpolation-image generation flag. Accordingly, an unnecessary interpolation image will not be generated.

A threshold for determining whether to generate an interpolation image or not may be variable. In the case where generation of an interpolation image has been executed for a frame preceding the target frame, smoothness of the moving picture may be spoiled if the generation of the interpolation image is avoided for the target frame for the reason that proportion R of the main vector group is lower than the threshold. Thus, the determination threshold may be set in accordance with continuity between frames.

In the present embodiment, whether or not to generate an interpolation image is determined based on proportion of the main vector group. However, the determination may be made based on proportion of the non-main vector group or the stationary vector group.

In the present embodiment, decoded motion-vectors resulting from decoding of the moving picture are utilized to determine whether or not to generate an interpolation image. Thus, determination with high accuracy can be achieved with a small amount of calculations. Furthermore, whether or not to generate the interpolation image is determined so as to meet two conditions: (i) the generation of the interpolation image is effective; and (ii) the picture appears properly. As a result, the interpolation image is generated only when the interpolation is reliably effective. Therefore, the minimum amount of calculations is required to generate the interpolation image. Accordingly, inconvenience such as delay in processing and increase in power consumption can be improved.

In the motion-vector search process (FIG. 8) according to the present embodiment, a block of which a motion-vector belongs to the main vector group is not searched anew, and an associated decoded motion-vector is directly used as the result of the search. As described above, the main vector represents a dominant motion in the frame. Thus, a decoded motion-vector which is similar to the main vector indicates a relatively reliable prediction result for the motion-vector search.

The motion-vector search process is performed only when proportion of the main vector group is high and the picture includes only one dominant motion. That is, the motion-vector search process is performed when, except blocks corresponding to the still block, each of motion-vectors of a large number of blocks is similar to the main vector. Thus, omitting to search blocks which have motion-vectors equivalent to the main vector can reduce the number of times of the search and thus search loads are also reduced.

In the present embodiment, searching is omitted for blocks associated with the decoded motion-vectors having substantially no difference from the main vector. However, to further reduce calculation loads, searching a block corresponding to the zero-vector as the decoded motion-vector may be omitted, and the zero-vector may be set as the search result.

In the filtering process (FIG. 9) according to the present embodiment, a block at a boundary between the still block and the moving block, a motion-vector corresponding to a different block is prevented from affecting the result of filtering, as shown in FIG. 10. Thus, reliability of obtaining motion-vectors can be further improved.

In block D3 of the filtering process, it is determined whether or not the target block corresponds to the moving block. However, it may be determined instead whether or not the target block corresponds to the Intra block. In this case, blocks in the frame are categorized into the Intra block and the inter block. The Inter blocks are further categorized into the moving block and the still block.

In this embodiment, the Inter block is a block in which, at the time of coding the moving picture data, a difference from a prediction signal between frames based on a motion-vector is coded. The Intra block is a block in which a difference from a prediction signal generated from pixels within a frame is coded. It can be determined based on a prediction mode in the decoding information whether or not a block corresponds to the Intra block. In addition, a block, of which a motion-vector resulting from the motion-vector search process is the zero-vector or close to the zero-vector, is called as a "still block". A block that does not correspond to the still block is called as a "moving block".

Figure 11:
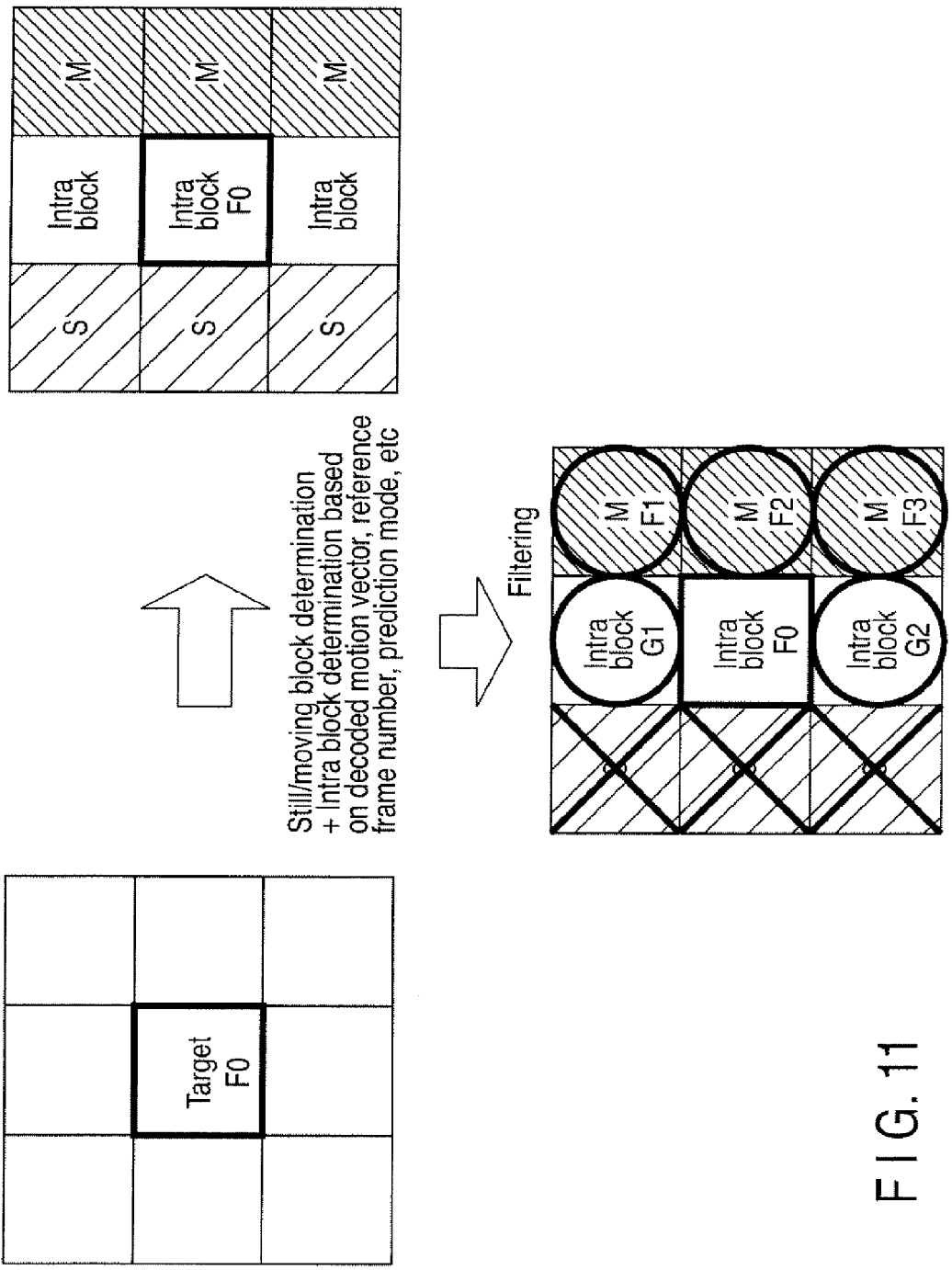
FIG. 11 is an exemplary view showing an example of filtering performed when a target block corresponds to an Intra block.

When the target block corresponds to the Intra block, the flow advances to block D4 from block D3. Then, the filtering process is performed without using motion-vectors of the surrounding blocks which do not correspond to the still block. When the target block does not correspond to the Intra block, filtering process is performed using motion-vectors of all the surrounding blocks in a similar manner to the general filtering process (block D5). In this case, as shown in FIG. 11, when block F0 targeted for the filtering corresponds to the Intra block, motion-vectors of blocks corresponding to the still block (denoted by S) of the eight surrounding blocks are not used for the filtering. The motion-vector of the target block F0 is subjected to the filtering process using a median of the motion-vectors of the surrounding Intra blocks G1 and G2 and moving blocks F1, F2, and F3.

As described above, according to the filtering process of FIG. 9 whether the target block corresponds to the still block or not can be determined based on the known decoding information with a small amount of calculations. A primary effect of the filtering process, that is, removal of incorrect motion-vectors can be achieved. In addition, an adverse effect such as elimination of a correct motion-vector can be suppressed. Thus, the accuracy of the filtering is improved.

Not all of the above-described interpolation determination process (FIG. 6), the motion-vector search process (FIG. 8), and the motion-vector filtering process (FIG. 9) but one or more of the processes may be optionally selected and performed in combination.

Modification

The present invention is not limited to the above-described embodiment and may be variously modified. For example, instead of the motion-vector filtering process shown in FIG. 9, a filtering process shown in FIG. 12 may be performed.

The modification of the motion-vector filtering process will be described below with reference to FIG. 12.

Figure 12:
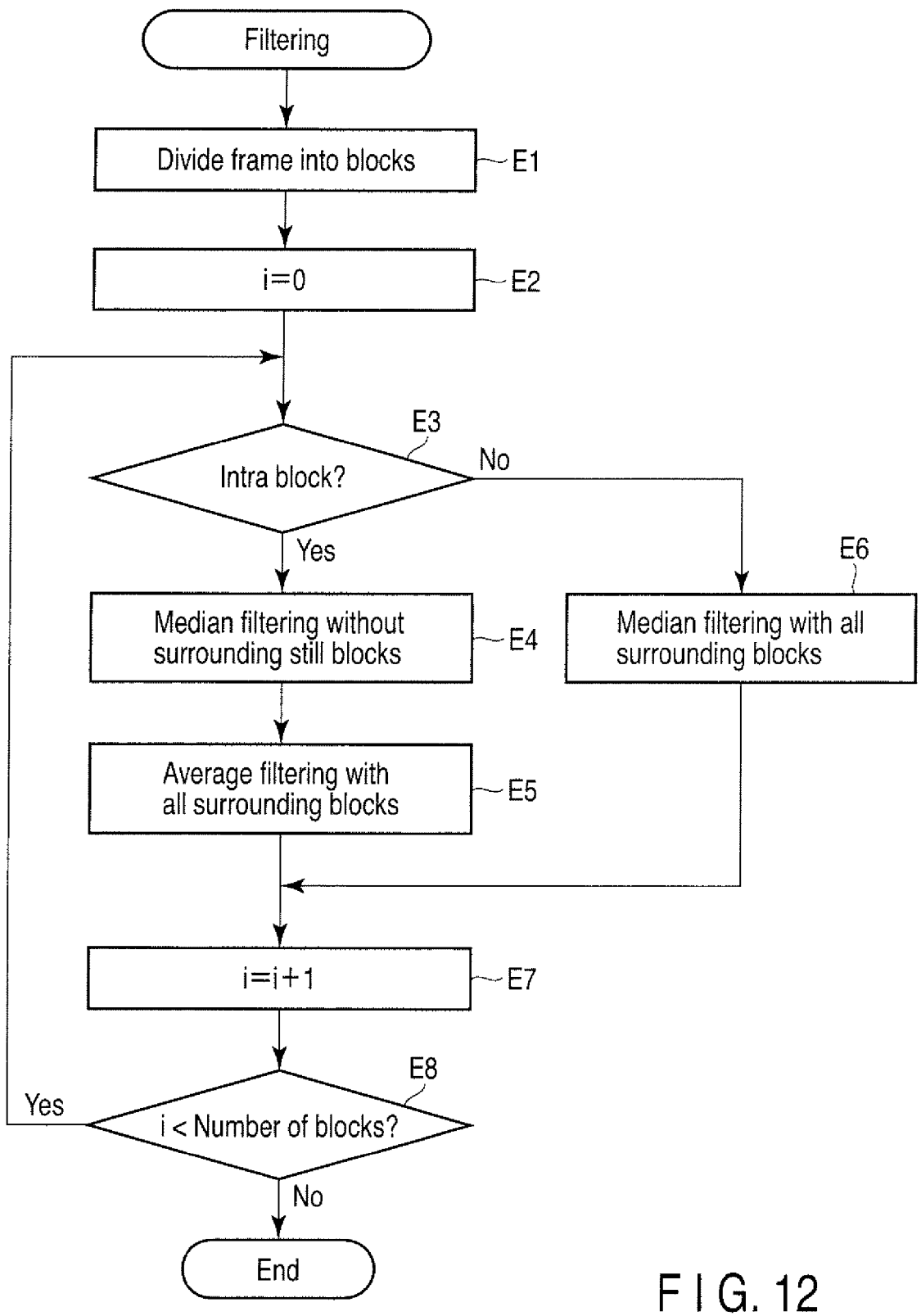
FIG. 12 is an exemplary flowchart showing modification of the motion-vector filtering process.

In the filtering process shown in FIG. 12, as is the case with the above-described filtering process, blocks in a frame are categorized into the Intra block and the Inter block. The Inter blocks are further categorized into the moving block and the still block.

At the time of coding moving picture data, a difference from an inter-frame prediction signal based on motion-vectors is coded in Inter block. In the Intra block, a difference from a prediction signal generated from pixels in a frame is coded. Based on a prediction mode contained in the decoding information, it can be determined whether or not a block corresponds to the Intra block. Furthermore, a block of which a motion-vector resulting from the motion-vector search process corresponds to or is close to the zero-vector is called as a "still block". A block that is not the still block is called as a "moving block".

As in the case of the main vector detection process, the motion-vector filter module 62 divides one frame into blocks, each of which includes the predetermined number of pixels (block E1). Then, 0 is substituted for variable i (block E2), and it is determined whether or not i-th block Li corresponds to the Intra block (block E3).

When the block Li corresponds to the Intra block (Yes in block E3), the median filtering process is performed in such a manner that the motion-vector of the block Li is replaced by a median of motion-vectors corresponding to the moving blocks, without using motion-vectors corresponding to the still blocks (block E4). Subsequently, the average filtering is performed by replacing the motion-vector of the block Li with an average of the motion-vectors of all the surrounding blocks (block E5).

On the other hand, when the block Li does not correspond to the Intra block (No in block E3), the median filtering process is performed using the motion-vectors of all the surrounding blocks similarly to the general filtering process (block E6).

Then, the value of variable i is incremented by one (block E7). It is determined whether or not the value i is smaller than the number of blocks n (block E8). When the value of variable i is smaller than the number of blocks n (Yes in block E8), the flow returns to block E3 to repeatedly perform the filtering on the next block Li. On the other hand, when the value of variable i is equal to or greater than the number of blocks n and the filtering is completed for all the blocks (No in block E8), the motion-vector filtering process is terminated. A motion-vector obtained by the filtering is sent to the motion compensation module 63 together with the decoded image data.

Figure 13:
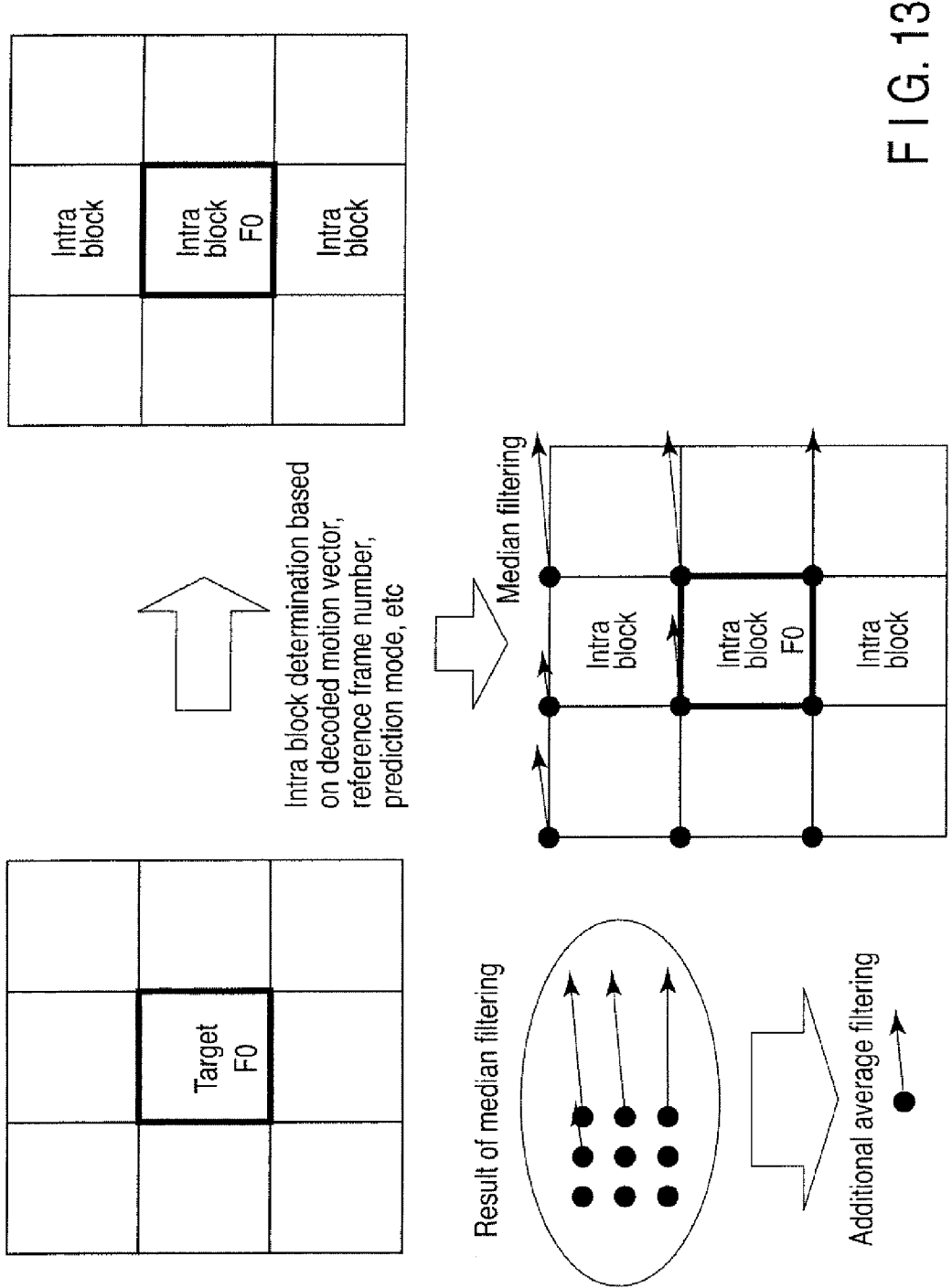
FIG. 13 is an exemplary view showing another example of filtering performed when the target block corresponds to the Intra block.

According to this filtering process, as shown in FIG. 13, when the target block F0 corresponds to the Intra block, the replacement (filtering) is performed using the median of the motion-vectors of the surrounding blocks excepting motion-vectors of the still blocks. After the median filtering is performed, the additional filtering is performed using the average of the motion-vectors of all the surrounding blocks.

In the Intra block, inter-frame coding may be regarded as difficult at the time of coding moving picture. Such a block may include an occlusion region (a background portion, which is hidden by an object moving through the image, becomes newly visible due to the movement of the object) and predicting a motion in the region is difficult. In the case where the motion is difficult to predict, execution of the filtering process of FIG. 12 using the average value of the surrounding motion-vectors allows the Intra block to be adjusted in accordance with surrounding motion and to prevent the picture being impaired.

While certain embodiments of the invention have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The various modules of the systems described herein can be implemented as software applications, hardware and/or software modules, or components on one or more computers, such as servers. The various modules of the systems may be stored on a computer-readable storage medium as a moving picture decoding program for controlling a computer to perform functions of the invention. While the various modules are illustrated separately, they may share some or all of the same underlying logic or code.

What is claimed is:

1. A moving picture decoding apparatus comprising:
a decoder configured to decode an input stream containing coded moving picture data and coding information of the coded moving picture data and configured to produce decoded moving picture data and decoding information;
an interpolation image generator configured to generate an interpolation image frame to be interposed between frames in the decoded moving picture data; and
an image generation controller configured to control the generation of the interpolation image frame based on the decoding information, wherein
the image generation controller includes an interpolation determination module configured to determine based on the decoding information whether or not to generate the interpolation image frame,
the image generation controller controls the interpolation image generator to generate the interpolation image frame when the interpolation determination module determines to generate the interpolation image frame,
the decoding information includes a motion-vector of each block in a frame of the coded moving picture data,
the interpolation determination module includes a main vector detector configured to detect from the motion-vectors included in the decoding information a motion-vector which is largest in number in the frame as a main vector,
the interpolation determination module determines to generate the interpolation image frame when proportion of blocks corresponding to the main vector in the frame is larger than a predetermined threshold,
the interpolation image generator comprises:
a motion-vector search module configured to search the decoded moving picture data for a motion-vector of each block in the frame, and
a motion-vector setting module configured to set the main vector detected by the main vector detector as a motion-vector with respect to a block wherein the motion-vector included in the decoding information coincides with the main vector, and
the interpolation image generator generates the interpolation image frame based on the motion-vector found by the motion-vector search module or the motion-vector set by the motion-vector setting module.

2. The moving picture decoding apparatus of claim 1, wherein
the main vector detector classifies the main vector and a motion-vector within a predetermined distance from the main vector into a main vector group, and
the interpolation determination module determines to generate the interpolation image frame when proportion of blocks corresponding to motion-vectors of the main vector group in the frame is larger than a predetermined threshold.

3. The moving picture decoding apparatus of claim 1, wherein
the decoding information includes a prediction mode, and
the motion-vector search module determines a block corresponding to inter-frame coding based on the prediction mode and, with respect to the block corresponding to the inter-frame coding and of which a motion-vector coincides with the main vector, sets the main vector detected by the main vector detector as the motion-vector.

4. The moving picture decoding apparatus of claim 1, wherein
the interpolation image generation controller comprises a filter configured to perform a filtering process wherein each block in a frame is categorized as a moving area block having a non-zero motion-vector and as a still area block having a zero motion-vector and a value of each component of the motion-vector of the moving area block is replaced by a median of corresponding components of motion-vectors of blocks surrounding the moving area block, and
the interpolation image generator generates the interpolation image frame based on the motion-vector replaced by the filter.

5. The moving picture decoding apparatus of claim 4, wherein
the decoding information includes a prediction mode, and
the filter determines a block corresponding to inter-frame coding based on the prediction mode, and performs a first filtering process wherein a block corresponding to inter-frame coding is determined based on the prediction mode, and a value of each component of a motion-vector of the block corresponding to the inter-frame coding is replaced by a median of corresponding components of motion-vectors of blocks surrounding the block except a block corresponding to the still area block.

6. The moving picture decoding apparatus of claim 5, wherein the filter performs a second filtering process wherein a value of each component of the motion-vector of the block subjected to the first filtering process is replaced by an average of corresponding components of motion-vectors of blocks surrounding the block.

7. A moving picture decoding method comprising:
a decoding step of decoding an input stream containing coded moving picture data and coding information of the coded moving picture data and producing decoded moving picture data and decoding information;
an interpolation image generation step of generating an interpolation image frame to be interposed between frames in the decoded moving picture data; and
an image generation control step of controlling the generation of the interpolation image frame based on the decoding information, wherein the image generation control step includes an interpolation determination step of determining based on the decoding information whether or not to generate the interpolation image frame,
the image generation control step controls the interpolation image generator to generate the interpolation image frame when the interpolation determination step determines to generate the interpolation image frame,
the decoding information includes a motion-vector of each block in a frame of the coded moving picture data,
the interpolation determination step includes a main vector detection step of detecting from the motion-vectors included in the decoding information a motion-vector which is largest in number in the frame as a main vector,
the interpolation determination step determines to generate the interpolation image frame when proportion of blocks corresponding to the main vector in the frame is larger than a predetermined threshold,
the interpolation image generation step comprises:
a motion-vector search step of searching the decoded moving picture data for a motion-vector of each block in the frame, and
a motion-vector setting step of setting the main vector detected by the main vector detection step as a motion-vector with respect to a block wherein the motion-vector included in the decoding information coincides with the main vector, and
the interpolation image generation step generates the interpolation image frame based on the motion-vector found by the motion-vector search step or the motion-vector set by the motion-vector setting step.

8. The moving picture decoding method of claim 7, wherein
the interpolation image generation step comprises a filter step configured to perform a filtering process wherein each block in a frame is categorized as a moving area block having a non-zero motion-vector and as a still area block having a zero motion-vector and a value of each component of the motion-vector of the moving area block is replaced by a median of corresponding components of motion-vectors of blocks surrounding the moving area block, and
the interpolation image generation step generates the interpolation image frame based on the motion-vector replaced by the filter step.

9. The moving picture decoding method of claim 7, wherein
the decoding information includes a prediction mode, and
the filter step performs a filtering process wherein a block corresponding to inter-frame coding is determined based on the prediction mode, and a value of each component of a motion-vector of the block corresponding to the inter-frame coding is replaced by a median of corresponding components of motion-vectors of blocks surrounding the block except a block corresponding to a still area block.

10. A non-transitory computer-readable storage medium storing a moving picture decoding program for controlling a computer to perform functions of:
a decoder configured to decode an input stream containing coded moving picture data and coding information of the coded moving picture data and configured to produce decoded moving picture data and decoding information;
an interpolation image generator configured to generate an interpolation image frame to be interposed between frames in the decoded moving picture data; and an image generation controller configured to control the generation of the interpolation image frame based on the decoding information, wherein the image generation controller includes an interpolation determination module configured to determine based on the decoding information whether or not to generate the interpolation image frame, the image generation controller controls the interpolation image generator to generate the interpolation image frame when the interpolation determination module determines to generate the interpolation image frame, the decoding information includes a motion-vector of each block in a frame of the coded moving picture data, the interpolation determination module includes a main vector detector configured to detect from the motion-vectors included in the decoding information a motion-vector which is largest in number in the frame as a main vector, the interpolation determination module determines to generate the interpolation image frame when proportion of blocks corresponding to the main vector in the frame is larger than a predetermined threshold, the interpolation image generator comprises:

a motion-vector search module configured to search the decoded moving picture data for a motion-vector of each block in the frame, and a motion-vector setting module configured to set the main vector detected by the main vector detector as a motion-vector with respect to a block wherein the motion-vector included in the decoding information coincides with the main vector, and the interpolation image generator generates the interpolation image frame based on the motion-vector found by the motion-vector search module or the motion-vector set by the motion-vector setting module.

11. The non-transitory computer-readable storage medium of claim 10, wherein the interpolation image generator comprises a filter configured to perform a filtering process wherein each block in a frame is categorized as a moving area block having a non-zero motion-vector and as a still area block having a zero motion-vector and a value of each component of the motion-vector of the moving area block is replaced by a median of corresponding components of motion-vectors of blocks surrounding the moving area block, and the interpolation image generator generates the interpolation image frame based on the motion-vector replaced by the filter.

12. The non-transitory computer-readable storage medium of claim 11, wherein the decoding information includes a prediction mode, and the filter performs a first filtering process wherein a block corresponding to inter-frame coding is determined based on the prediction mode, and a value of each component of a motion-vector of the block corresponding to the inter-frame coding is replaced by a median of corresponding components of motion-vectors of blocks surrounding the block except a block corresponding to the still area block.

* * * * *